US008266216B2

(12) United States Patent
Rusitschka et al.

(10) Patent No.: US 8,266,216 B2
(45) Date of Patent: Sep. 11, 2012

(54) SCALABLE PEER-TO-PEER NETWORK WITH A DIRECTORY SERVICE

(75) Inventors: Steffen Rusitschka, München (DE); Alan Southall, München (DE)

(73) Assignee: Siemens Aktiengesellschaft, Munich (DE)

( * ) Notice: Subject to any disclaimer, the term of this patent is extended or adjusted under 35 U.S.C. 154(b) by 1263 days.

(21) Appl. No.: 10/488,794

(22) PCT Filed: Sep. 4, 2002

(86) PCT No.: PCT/DE02/03271
§ 371 (c)(1),
(2), (4) Date: Mar. 5, 2004

(87) PCT Pub. No.: WO03/024021
PCT Pub. Date: Mar. 20, 2003

(65) Prior Publication Data
US 2005/0021617 A1    Jan. 27, 2005

(30) Foreign Application Priority Data
Sep. 6, 2001 (DE) .................................. 101 43 754

(51) Int. Cl.
*G06F 15/16* (2006.01)
*G06F 15/173* (2006.01)
(52) U.S. Cl. ........................................ 709/206; 709/226
(58) Field of Classification Search .................. 709/206, 709/238, 226; 370/256, 408; 705/24
See application file for complete search history.

(56) References Cited

U.S. PATENT DOCUMENTS

| | | | | |
|---|---|---|---|---|
| 5,095,480 A * | 3/1992 | Fenner | ........................... | 370/238 |
| 5,946,316 A * | 8/1999 | Chen et al. | ..................... | 370/408 |
| 5,970,069 A * | 10/1999 | Kumar et al. | ................. | 370/402 |
| 6,006,259 A * | 12/1999 | Adelman et al. | .............. | 709/223 |
| 6,078,957 A * | 6/2000 | Adelman et al. | .............. | 709/224 |
| 6,240,089 B1 * | 5/2001 | Okanoue et al. | .............. | 370/390 |
| 6,389,475 B1 * | 5/2002 | Speakman et al. | ............ | 709/232 |
| 6,393,428 B1 * | 5/2002 | Miller et al. | ........................... | 1/1 |
| 6,611,872 B1 * | 8/2003 | McCanne | ..................... | 709/238 |
| 6,850,252 B1 * | 2/2005 | Hoffberg | ....................... | 715/716 |
| 7,065,587 B2 * | 6/2006 | Huitema et al. | .............. | 709/245 |
| 2002/0049760 A1 * | 4/2002 | Scott et al. | ....................... | 707/10 |

(Continued)

FOREIGN PATENT DOCUMENTS
EP    1009130 A1    6/2000

OTHER PUBLICATIONS

Stoica et al., "Chord: A Scalable Peer-to-Peer Lookup Service for Internet Applications", Oct. 2001, pp. 149-160.

(Continued)

*Primary Examiner* — Kenny Lin
*Assistant Examiner* — Gerald Smarth
(74) *Attorney, Agent, or Firm* — Staas & Halsey LLP

(57) ABSTRACT

A method for creates a directory service in a scalable peer-to-peer-network, which is distributed to groups having at least one peer. In order to release a resource and to start a search enquiry for a resource, allocation values are formed using an allocation instruction according to the resource allocation values from a predefined address area. Only one group is responsible for each allocation value and the release of a resource or search enquiry for a resource is transmitted to the responsible group only.

16 Claims, 2 Drawing Sheets

U.S. PATENT DOCUMENTS

| | | | | |
|---|---|---|---|---|
| 2002/0129133 | A1* | 9/2002 | Olsen | 709/223 |
| 2002/0138440 | A1* | 9/2002 | Vaidyanathan et al. | 705/54 |
| 2002/0143989 | A1* | 10/2002 | Huitema et al. | 709/243 |
| 2003/0055818 | A1* | 3/2003 | Faybishenko et al. | 707/3 |
| 2005/0086300 | A1* | 4/2005 | Yeager et al. | 709/204 |
| 2008/0301445 | A1* | 12/2008 | Vasic et al. | 713/171 |

OTHER PUBLICATIONS

Trinkey, "An Efficient Scheme for Query Processing on Peer-to-Peer Networks", Jan. 2001, pp. 1-10.

"Scoping Multicasts in Wan-Interconnected Local Networks", IBM Technical Disclosure Bulletin, vol. 34, No. 8, Jan. 1992, pp. 68-71.

Findeli, "Peer-to-Peer (P2P) Networking", Jul. 2001, pp. 1-21.

Zhuang et al.:"Bayeux: An Architecture for Scalable and Fault-tolerant Wide-area Data Dissemination", Computer Sciense Division, University of California, Berlkley, CA, pp. 01-05; Zhuang et al.:"Bayeux: An Architecture for Scalable and Fault-tolerant Wide-area Data Dissemination", Computer Sciense Division, University of California, Berlkley, CA, pp. 01-05; Zhuang et al.:"Bayeux: An Architecture for Scalable and Fault-tolerant Wide-area Data Dissemination", Computer Sciense Division, University of California, Berlkley, CA, pp. 01-05; Others.

Sawata, Masato et al., Report from Information Processing Society of Japan 2000-AI-71-1 (Algorithm 71-1 (Jan. 17, 2000)); Others.

* cited by examiner

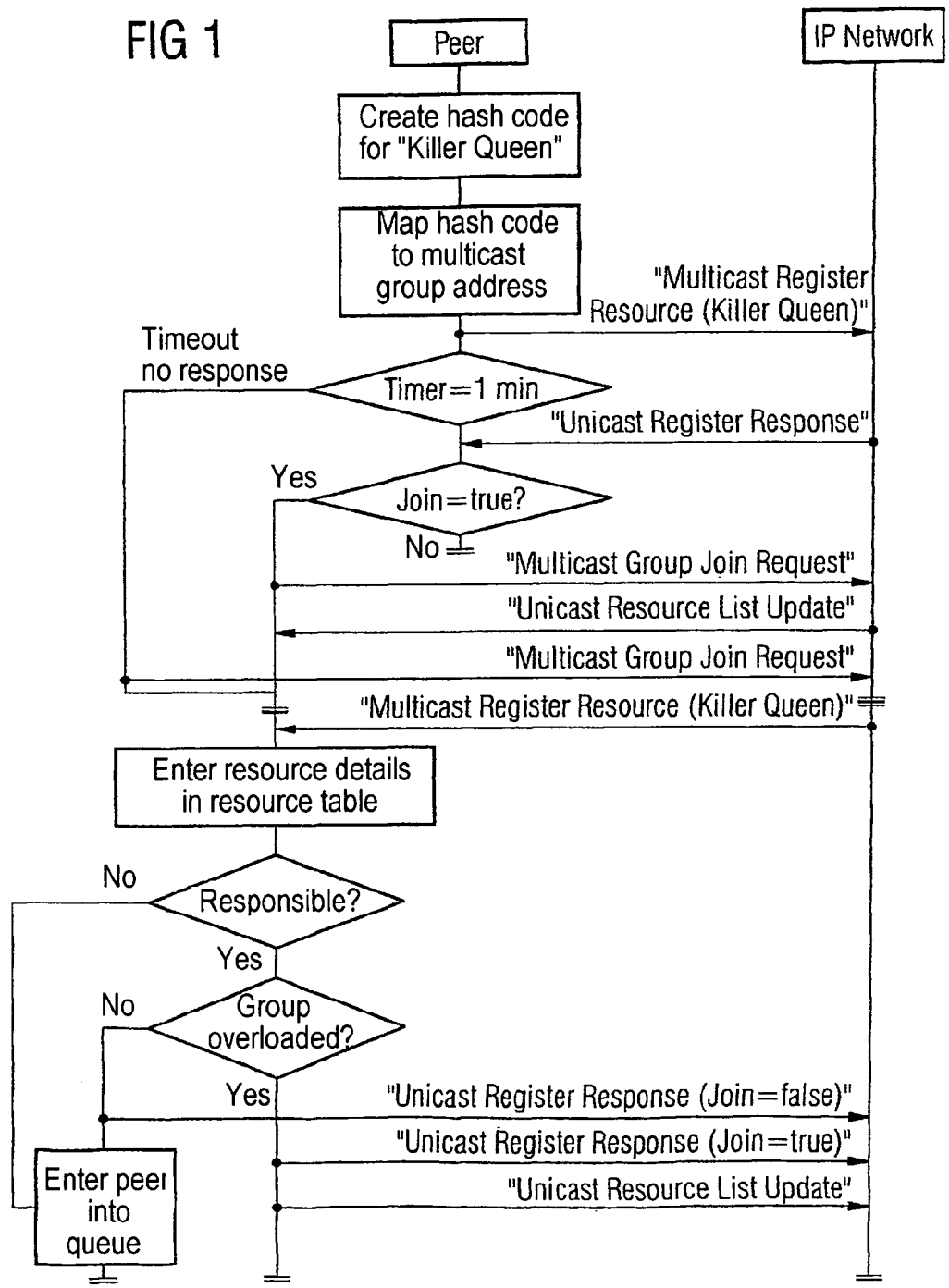

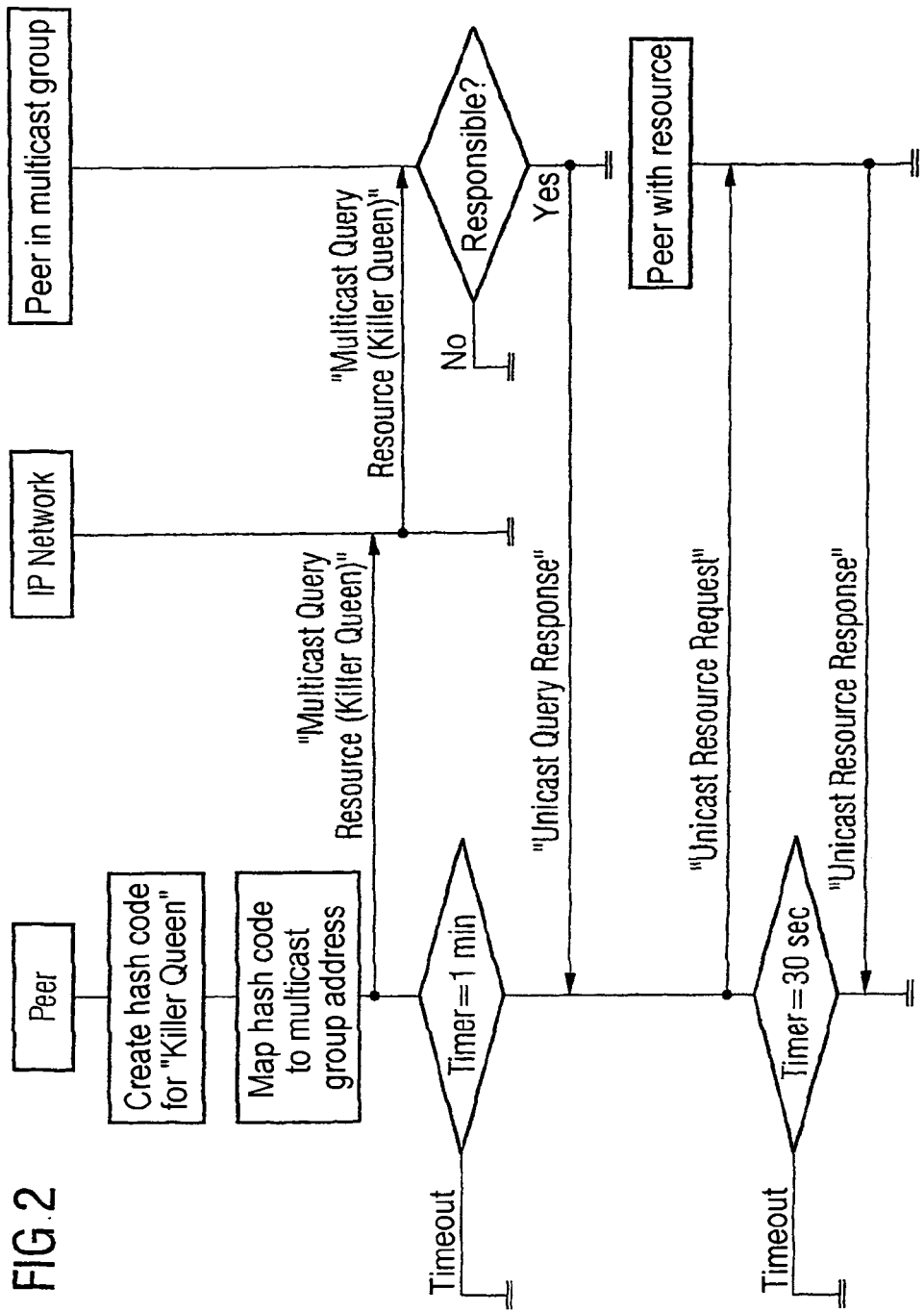

SCALABLE PEER-TO-PEER NETWORK WITH A DIRECTORY SERVICE

CROSS REFERENCE TO RELATED APPLICATIONS

This application is based on and hereby claims priority to PCT Application No. PCT/DE02/03271 filed on Sep. 4, 2002 and German Application No. 101 43 754.4 filed on Sep. 6, 2001, the contents of which are hereby incorporated by reference.

BACKGROUND OF THE INVENTION

The invention relates to scalable peer-to-peer networks.

With known scalable networks, that is networks on which there are no restrictions as regards the number of peers, such as Napster, Gnutella, Freenet, etc. peers, that is computers, can log on, search for files among all registered peers and/or release their own files for access by other computers (known as file sharing).

In this case, with centrally-biased peer-to-peer networks, peers are logged on with one or more central servers and files which are to be released by the peers are registered with a directory service running on a server.

To search for a specific file a peer puts in a specific search request to the server which then sends it a list of peers (directory service), that have 'released' this file. The searching peer can then select one of these peers and request or download the file directly from this peer.

A disadvantage of these centrally biased peer-to-peer networks, such as Napster, iMesh, Audiogalaxy, Songspy etc. for example, is that they depend on the availability of a central server, without which the directory service and thereby the logon, registration and search for released files do not function.

Furthermore decentralized peer-to-peer-networks exists without central servers for a directory service. In such networks a peer dynamically discovers other peers in networks and communicates with them in order to exchange files and information. Advantageously the function and availability of such a decentralized network does not depend on the function and availability of a central server. However the peers must find each other by themselves. This generally only happens within a specific local area (e.g. using IP multicasting with a maximum hop count) or by using a list of previously known peers, which is created manually or is requested by specific servers.

A decentralized peer-to-peer-network additionally requires a self-contained routing protocol with which the file is routed via various peers. To search for a file a peer transfers its search request to the peers known to it, which also behave in the same way. In this way the entire network (all peers) is flooded with the search request and each peer which has released a file corresponding to the search request notifies this to the peer initiating the search. The peer conducting the search can then select one of these peers and request the file directly from them.

Such decentralized peer-to-peer-networks, for example Gnutella, KaZaA, Freenet, MojoNation, Edonkey2000, etc. do not offer a directory service, that is there are no lists that can be retrieved from the network with information about the released files. Disadvantageously searches in these types of decentralized peer-to-peer-networks, because of the need to flood the entire network with requests, are comparatively time-intensive and ineffective.

SUMMARY OF THE INVENTION

One potential object of the present invention is to create a method of forming a directory service in a peer-to-peer-network which allows a rapid and effective search for released resources and guarantees high availability and functionality of the peer-to-peer network.

By dividing up the directory service into a plurality of groups a search request can be transferred quickly and effectively to the corresponding groups and a response provided without the availability and the function of the entire network depending on a central server.

In this case the request for release of a resource or search for a resource need only be transferred to some of the peers in a peer-to-peer-network, so that advantageously the efficiency and speed of a search or release is increased compared to flooding the entire network with requests. At the same time however an (unlikely) failure of an entire group does not result in the entire peer-to-peer-network becoming inoperable.

The failure of an entire group can be prevented by a plurality of group members storing identical information. Forming groups in this way advantageously produces information redundancy within the group, so that the failure of individual computers in a group does not result in loss of information across the released files (directory).

A resource is assigned to a group in the preferred embodiment using an assignment specification, for example the hashing procedure, by which assignment values, for example hash values, are calculated from a prespecified limited range of values depending on the resource or its known parameters.

Examples of parameters that can be used here are type of resource, designation of resource etc. It is thus conceivable for a file as a resource to be released (file sharing application) to calculate 16-bit wide hash values—that is from a range of values or address space from 0-65535—from the file name or parts of a name.

This type of assignment does not necessarily have to be unique, so that even with a unique responsibility of a group for at least one assignment value, especially a hash value, a group is as a rule responsible for a plurality of resources.

In the preferred embodiment an assignment value calculated in this way is mapped uniquely to a single multicast IP address, for example by address tables, in which case a group is only responsible for one multicast IP address and each request is only transferred to the group or groups responsible.

Naturally it is also conceivable to assign a plurality of multicast IP addresses or a whole range from a specified known address area to a group. In this case the groups can administer their own size and effectiveness using the corresponding predefined limits or threshold values. For example it is conceivable for a group of peers, on reaching a maximum size (number of peers) to be divided into two groups and for each group to be responsible for one address area which is also divided up—halved for example. This type of new division could then be transferred as additional information for each dialog (search request, registration and release of resources), so that in turn each request is only transferred to the group or groups responsible.

A request (release or search) is transferred preferably using IP multicasting, for example within an IP-based larger network, preferably the internet. Advantageously searching here is faster and more efficient using this method than when using known peer-to-peer routing (no longer any routing at application level).

In a preferred embodiment the information (about released resources, the associated peers or their IP address etc.) is available redundantly in a group of several peers. The advantage of using this method is that if individual peers or a plurality of peers of a group fail, the functional capabilities of this group are preserved.

In a further embodiment only a selected peer answers a request (search or release) within the responsible group so that advantageously the speed of a request and a result can be increased compared to a dialog with all group members. The peers to answer the request or conduct the dialog are selected, for example, using a distance metric such as the lowest hop count, or by predefined specifications such as being the first member of a group for example (first logged on).

In a further embodiment a new peer is notified when a resource is registered or released of whether it is to be an active or passive member of the group or groups to which it has made the request by the IP multicast. The decision about active or passive member advantageously depends here on the load or the utilization of the group, which can be obtained using the usual mechanisms from individual parameters (number of search requests, transmission rate) or any combination of this. If a certain predefined threshold value of a load is exceeded, a new peer is notified on logon that it is to be an active member of the group and transmit the information of the group.

If the load drops below a specific threshold value which can be identical to the threshold value given above but does not absolutely have to be, a new peer is notified on logoff that it will only be a passive member of the group. These types of passive member can for example be maintained in a queue—sorted for example in order or request time or similar criteria—and be activated in turn when the load of a group is exceeded.

In a further embodiment there is the option for individual active group members (peers) when the limit value of their own (peer) load is reached or if there is a malfunction, to become passive members of the group and possibly to be replaced by other passive members, for example because the limit value of the utilization of the group was exceeded by this or because a basic exchange regulation exists.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a flowchart for registering and releasing resources of a new peer in a peer-to-peer-network with a distributed directory service in accordance with one possible embodiment of the invention (resource registration and group formation); and FIG. 2 is a flowchart for searching for resources in a peer-to-peer-network with a distributed directory service in accordance with one possible embodiment of the invention (resource search and transmission).

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The exemplary embodiment shows the method of a file-sharing application which is making a file available for shared use. The hash values here are typically 16 bits wide and will be generated from the individual words of the file name (e.g. with a standard algorithm such as that of the Java string class). 239.192.0.0-239.192.255.255 is selected as multicast IP address range in the exemplary embodiment, which is reserved by the IANA for internal organization applications (RFC 2365) and for example can be freely used by any company.

The following paragraphs give a detailed description of how a peer inserts itself into the network, how a peer registers its released files in the network (FIG. 1) and how the search is conducted within the network (FIG. 2), as shown in the flowcharts in accordance with FIG. 1 and FIG. 2.

Registration or release of files in accordance with FIG. 1

To make a file available a peer calculates its hash value (for example using the name "Killer Queen"—or the name components "Killer" and "Queen" separated by spaces or another predefined separator—with the hash function of the Java String class) and sends a registration request "Multicast Register resource (Killer Queen)" to the associated multicast address the which it determines from an address table present in the peer.

In this case a peer knows not only about the mapping specification (determining hash values depending on the resource and mapping them to corresponding multicast IP addresses) but also the range of values of the hash values as well as the address based on the multicast IP addresses (for example in the form of client software running on the peer).

With the registration request in this case, in addition to the designation of the resource to be released, for example the file "Killer Queen" and its own IP address, for example 138.24.67.88, unique identification information, for example what is known as a UUID (Universal Unique Identifier) can also be transferred in a packet registration packet.

If no other peer is accountable or responsible for this multicast IP address—which can be detected by the peer on the basis of a timeout, for example "Timer>1 min" or the fact that a corresponding response packet is missing, possibly only after unsuccessful repetition (prespecified number of attempts) it continues to administer its own search and registration requests to this multicast IP address.

To do this it sends an IP multicast "Join Group" packet to obtain packets which are directed to this multicast address or enters its own resource to be released (including the additional information mentioned above, that is the IP address, designation etc.) into its (group) resource table.

Otherwise the peer receives a confirmation "Unicast Register Response" to its registration request by at least one peer of the group and thereby the notification of whether it is an active or passive group member, i.e. whether it should continue to process requests to the multicast IP address or is to be entered into a queue in order to be accepted later if necessary into the group of active administrators of the information which are assigned to this multicast IP address. The decision about active or passive membership can be taken here so that it depends on at the load of the group (CPU load, memory capacity etc.).

If the peer becomes an active administrator, after a "Multicast Group Join Request" to the group, it receives the current information on the registered resource "Unicast Resource List Update" and about other group members of at least one, for example determined using a predefined selection procedure, other active group members (its update of the resource table, for example using unicast and download of the resource table of another group member via ftp).

If its membership of one or more groups means that the network connection or system resources of a peer, because of high CPU load have too little memory capacity or of overloaded, the peer can cause itself to become a passive group member.

The actions or reactions of the group or of least one peer of a group to the previously described (top half of FIG. 1) requests of a requesting peer are shown for clarification as a flowchart in the lower half of FIG. 1. Accordingly a (registration) requesting peer only receives a response to become an active member with a "Unicast Register Response".

(Join=true), if it is responsible and the group is not overloaded. Otherwise the requesting peer is entered into a queue, as shown.

EXAMPLE

The peer "xyz" would like to release the file "Killer Queen". It generates the two words of the hash values. Let these be 12345 for "Killer" and 42424 for "Queen". Now it sends the registration information to the multicast IP addresses (12345->) 239.192.48.57 and (42424->) 239.192.165.184.

Using the responses which it receives to its original information, as well as its load situation, it now becomes an active or a passive member in the two groups to which the multicast IP addresses are assigned.

Searching for a file in accordance with FIG. 2

A peer can now find a file using its "keywords" for example "Killer" or "Queen". If for example a peer is looking for files with "Queen" in the file name, it generates the hash value for this word ("42424"), determines, by an address table for example, the multicast IP address for this hash value (239.192.165.184) and sends to this multicast IP address via an IP-based network its query "Multicast Query resource (Killer Queen)" for files with "Queen" or as in the exemplary embodiment "Killer Queen" in the filename for example as a packet with further information such as its own IP address, UUID, etc. and waits for a response (Unicast Query Response).

Within this group one or more peers are selected (for example in accordance with a specified selection process such as round robin or similar) that respond to the search query "Multicast Query resource (Killer Queen)" by "Unicast Query Response", and give it the requesting peer a list of peers from which it can directly obtain the files with "Queen" in the file name.

Where the response "Unicast Query Response", for example no group available or transmission error, is not received successfully within a specific time interval, for example timer <1 min, "no hits found" is returned as a result as a response to the requesting peer, possibly after a prespecified number of repetition attempts.

For one or more of these peers, as shown in the bottom half of FIG. 2, the requesting peer can start a direct request "Unicast resource Request" (IP unicasting) and is a specific connection if is there is a successful connection within a specific time limit "Timer=30sec" receive a response "Unicast resource Response" with the resource that it is looking for, for example the file "Killer Queen".

If the time limit set by the timer is exceeded—for example because the peer sought is offline or with some other connection error—the requesting peer can make a further or other connection requests "Unicast resource Request" to this peer or to other peers in the list transferred to it.

The method used in the exemplary embodiment is explained in more detail below.

Hashing method

For each resource that a peer wishes to release one or more hash values is generated (in a defined range or address space, e.g. 0-65535 for a 16-bit hash value). This is done by a hash function which is known to each peer. A resource could be a file for example the hash value is generated in this case from the file name (better: from the individual "words" of the name). Hash values can however also be created in combination or individual units from other parameters are identifying a resource, for example service descriptions for distributed services (Jini,.NET, etc.), file type or extension (.doc,.mp3, jpg, mpg, etc.) and such like. This means that the method is not just limited to file sharing applications, but can be used with any services (printer sharing, modem sharing, etc.).

For each hash value there exists exactly one group of peers which is responsible for it.

A resource with a specific hash value is registered with the group of peers which is also assigned to this hash value. A group in this case, as in the exemplary embodiment, is only responsible for one hash value. However, as explained above, other embodiments are conceivable, in a group is responsible for hash values in a specific range (e.g. 32768-65535).

For each hash value of a resource the peer registers this with the group which is responsible for this hash value.

For a search request a hash value is also generated. For this hash value the group responsible is determined and the search request is made to this group. The group or the peer of this group selected in accordance with a corresponding specification (ranking, smallest distance to requesting peer or smallest hop count) transfers the result of the search directly to the searching peer.

Although the hashing method was selected in the exemplary embodiment as the assignment specification, it is of course conceivable for any assignment method to the used to which the steps explained above for the hashing method could be transferred, so that the invention is not restricted to the use of the hashing method.

Group formation

A multicast IP address from a specific range is assigned to each group of peers. The size of this range is produced by the hash values used (with a 16-bit hash value for example multicast IP addresses in the range x.y.0.0-x.y.255.255 are needed).

If a peer would like to make a resource available it determines the hash value of the resource and publishes the position of the resource at the corresponding multicast IP address. If no responsible receiver for messages to this multicast IP address exists the peer is responsible for this address itself and continues to process incoming registration messages and search requests. Further peers which register resources in this multicast group, support the administration of the resource in this group. Peers which register new resources in the group after there are already sufficient administrators responsible for the resources of this group will be administered in a queue and can support the group on overloading and replace failed group members.

In the simplest case search requests to a multicast group are answered by all members of the group. The efficiency of the processing can be increased by determining the group member which responds by using a suitable (e.g. distance) metric. If, taking into account the metric used, the number of members of the group—from the pool of waiting peers—is adapted to the request load, a balanced system can advantageously result which avoids overloading individual peers and administers itself.

To determine the multicast group responsible for a given hash value which is necessary for bootstrapping a peer and also for searching for resources different methods are conceivable: With a suitable allocation of ranges and multicast IP addresses "Brute-Force" mechanisms with a logarithmic overhead are possible. Through the replication of "Valid Address Tables", if necessary with direct support by the IP router or in the backbone the overhead can even be reduced to a single request.

The method in accordance with the system described here basically advantageously subdivides a directory service in each case (all exemplary embodiments) automatically between the peers that register in the network. In this case, if there is an increase in released resources (the more peers there are in the network the more files there are registered as a rule) the directory is simultaneously divided up between the increased number of peers needed. Compared to decentralized networks this method prevents search requests flooding of the entire peer-to-peer-network, but explicitly directs the requests to peers possessing the information about the files in question. In this case the system adapts automatically to the resources available (peers, released files).

The invention has been described in detail with particular reference to preferred embodiments thereof and examples, but it will be understood that variations and modifications can be effected within the spirit and scope of the invention.

The invention claimed is:

1. A method for creating a directory service in a scalable peer-to-peer-network, comprising:
    distributing the directory service over groups, each group containing at least one peer;
    forming assignment values to release resources or to search for resources, the assignment values being formed from a predefined address space using an assignment specification, which assignment specification depends on the resource;
    making only one group responsible for each assignment value; and
    transferring a release of a resource and/or a search for a resource only to the group responsible wherein
    a hash method is used as the assignment specification,
    hash values are calculated using the hash method,
    the hash values are used as assignment values,
    IP multicasting is used to direct the release of the resource or the search for the resource only to the group responsible, and
    the at least one peer is notified that it will be an active member of the group if a predefined threshold value of a load is exceeded.

2. The method in accordance with claim 1, wherein each group is assigned a multicast IP address.

3. The method in accordance with claim 2, wherein
    there is a unique assignment of the hash values to multicast IP addresses, and
    the unique assignment is made using address tables.

4. The method in accordance with claim 3, wherein
    a populated group contains a plurality of peers, and
    within the populated group, redundant information is stored relating to released resources and the associated peers.

5. The method in accordance with claim 4, wherein
    when a group is responsible for an assignment value, only one selected peer responds to the release of a resource associated with the assignment value and/or the search for a resource associated with the assignment value, and
    the peer that responds is the closest peer as defined using a hop count.

6. The method in accordance with claim 5, wherein
    when a new peer releases a resource, the new peer is assigned to an existing group associated with the resource,
    depending on the load on the existing group, the new peer becomes an active member or a passive member, and
    passive members are put in a queue.

7. The method in accordance with claim 6, wherein
    the new peer becomes a new active member, and
    the new active member changes to a new passive member when the load on the group decreases.

8. The method in accordance with claim 1, wherein there is a unique assignment of the hash values to multicast IP addresses.

9. The method in accordance with claim 8, wherein the unique assignment is made using address tables.

10. The method in accordance with claim 1, wherein
    a populated group contains a plurality of peers, and
    within the populated group, redundant information is stored relating to released resources and the associated peers.

11. The method in accordance with claim 1, wherein
    when a group is responsible for an assignment value, only one selected peer responds to the release of a resource associated with the assignment value and/or the search for a resource associated with the assignment value.

12. The method in accordance with claim 11, wherein the peer that responds is the closest peer as defined using a hop count.

13. The method in accordance with claim 11, wherein
    the new peer becomes a new active member, and
    the new active member changes to a new passive member when the load on the group decreases.

14. The method in accordance with claim 1, wherein
    when a new peer releases a resource, the new peer is assigned to an existing group associated with the resource,
    depending on the load on the existing group, the new peer becomes an active member or a passive member, and
    passive members are put in a queue.

15. A non-transitory computer readable medium to control a computer to perform a method comprising:
    distributing the directory service over groups, each group containing at least one peer;
    forming assignment values to release resources and/or to search for resources, the assignment values being formed from a predefined address space using an assignment specification, which assignment specification depends on the resource;
    making only one group responsible for each assignment value; and
    transferring a release of a resource and/or a search for a resource only to the group responsible, wherein
    IP multicasting is used to direct the release of the resource or the search for the resource only to the group responsible, and
    the at least one peer is notified that it will be an active member of the group if a predefined threshold value of a load is exceeded.

16. A method for a searching peer to obtain a resource in a file sharing network, comprising:
    distributing a directory service over groups, each group containing at least one peer;
    forming hash values to release resources and to search for resources, the hash values being formed from a predefined address space, such that each group is assigned a predetermined hash value or range of hash values and only one group is responsible for each hash value, each hash value having address information identifying which peer has possession of a resource and identifying where the resource is located with the peer;

searching for the resource by transferring a search hash value only to the group responsible for the search hash value; and delivering the resource to the searching peer from peer having possession of the resource, wherein IP multicasting is used to direct the release of the resource or a search for the resource only to the group responsible, and the at least one peer is notified that it will be an active member of the group if a predefined threshold value of a load is exceeded.

* * * * *